United States Patent
Kim et al.

(10) Patent No.: US 12,283,039 B2
(45) Date of Patent: Apr. 22, 2025

(54) METHOD AND SYSTEM FOR DEFECT INSPECTION BASED ON DEEP LEARNING

(71) Applicant: HYUNDAI MOBIS CO., LTD., Seoul (KR)

(72) Inventors: Tae Hyun Kim, Seoul (KR); Hye Rin Kim, Yongin-si (KR); Yeong Jun Cho, Gwangju (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 359 days.

(21) Appl. No.: 17/515,950

(22) Filed: Nov. 1, 2021

(65) Prior Publication Data

US 2022/0189002 A1 Jun. 16, 2022

(30) Foreign Application Priority Data

Dec. 15, 2020 (KR) .................. 10-2020-0175771

(51) Int. Cl.
*G06T 7/00* (2017.01)
*G06F 18/21* (2023.01)
(Continued)

(52) U.S. Cl.
CPC .......... *G06T 7/001* (2013.01); *G06F 18/2148* (2023.01); *G06F 18/217* (2023.01); *G06F 18/2413* (2023.01)

(58) Field of Classification Search
CPC ................. G06T 7/0002; G06T 7/0004; G06T 7/0006; G06T 7/0008; G06T 7/001;
(Continued)

(56) References Cited

U.S. PATENT DOCUMENTS

2018/0232601 A1* 8/2018 Feng ............... G06T 7/0004
2018/0232870 A1* 8/2018 Jo .................... G01N 25/72
(Continued)

FOREIGN PATENT DOCUMENTS

CN 110691127 A * 1/2020 ............ H04L 67/10
WO WO-2019107614 A1 * 6/2019 ........... G06K 9/3233

OTHER PUBLICATIONS

Benbarrad et al., "Intelligent machine vision model for defective product inspection based on machine learning," 2020 International Symposium on Advanced Electrical and Communication Technologies (ISAECT), Marrakech, Morocco, 2020, pp. 1-6, doi: 10.1109/ISAECT50560.2020.9523643. (Year: 2020).*
(Continued)

*Primary Examiner* — Ming Y Hon
*Assistant Examiner* — Julia Z. Yao
(74) *Attorney, Agent, or Firm* — NovoTechIP International PLLC (57) ABSTRACT

The present disclosure in some embodiments provides a product inspection method and a system based on deep learning for detecting a product defect. The present disclosure provides a product inspection method and system for detecting product defects by linking a predeveloped deep learning-based classification model to interwork with the existing product inspection system while fine-tuning the classification model to be maintained or supplemented by instantly correcting errors of the classification model, thereby improving the accuracy of product quality inspection.

1 Claim, 4 Drawing Sheets

(51) Int. Cl.
*G06F 18/214* (2023.01)
*G06F 18/2413* (2023.01)

(58) Field of Classification Search
CPC ............ G05B 3/0243; G05B 19/41875; G05B 23/0275; G05B 23/0235; G06V 2201/06; G06F 18/217; G06F 8/2148
See application file for complete search history.

(56) References Cited

U.S. PATENT DOCUMENTS

| | | | | |
|---|---|---|---|---|
| 2018/0322623 | A1* | 11/2018 | Memo | G06N 3/084 |
| 2020/0334524 | A1* | 10/2020 | Sprague | H04L 67/12 |
| 2021/0406644 | A1* | 12/2021 | Salman | G06N 3/045 |
| 2022/0156574 | A1* | 5/2022 | Anwar | G06N 20/00 |
| 2022/0391759 | A1* | 12/2022 | Okuno | G06T 7/00 |
| 2023/0153974 | A1* | 5/2023 | Li | G06T 7/0004 |
| | | | | 382/149 |
| 2023/0281791 | A1* | 9/2023 | Hyatt | G06V 10/764 |
| | | | | 382/141 |

OTHER PUBLICATIONS

Sun et al., "Adaptive Federated Learning and Digital Twin for Industrial Internet of Things," in IEEE Transactions on Industrial Informatics, vol. 17, No. 8, pp. 5605-5614, Aug. 2021. [online] Pub Date: Oct. 29, 2020. doi: 10.1109/TII.2020.3034674. (Year: 2020).*
Wei, et al., "CNN-based reference comparison method for classifying bare PCB defects", in The Institute of Engineering and Technology Journals, Aug. 13, 2018, vol. 2018, Issue 16, pp. 1528-1533.

* cited by examiner

METHOD AND SYSTEM FOR DEFECT INSPECTION BASED ON DEEP LEARNING

CROSS-REFERENCE TO RELATED APPLICATIONS

This application is based on, and claims priority from, Korean Patent Application Number 10-2020-0175771, filed Dec. 15, 2020, the disclosure of which is incorporated by reference herein in its entirety.

BACKGROUND OF THE INVENTION

1. Field of the Invention

The present disclosure in some embodiments relates to a product inspection method and system based on deep learning for detecting a product defect. More particularly, the present disclosure relates to a product inspection method and system having a predeveloped deep learning-based classification model linked to the existing product inspection system while fine-tuning the classification model to be maintained or supplemented by instantly correcting errors of the classification model.

2. Discussion of Related Art

The statements in this section merely provide background information related to the present disclosure and do not necessarily constitute prior art.

Existing image information-based product inspection systems for detecting defective products generally use a simple rule-based algorithm such as binary inspection. The rule-based algorithm may not have high judgment accuracy because the evaluation standard for determining product quality is too naive and unitary. These shortcomings tend towards frequent false defects (determining a good product as being defective) occurring in the manufacturing process, reducing a non-adjusted ratio of product production. For example, a product once finished may conceal defects to be discovered late in the re-inspection process, resulting in significant cost lost wherein the finished product may not be reinstated due to the defective part being irreparable to waste the whole finished product. Additionally, the existing rule-based methods are difficult to cope with situational changes such as minute differences in position and lighting during product inspection, and they do not detect new types of defects well. These issues have been resolved by process management staffs allocated every time to correct and calibrate a set of parameters of the rule-based system, which poses a new issue in its own right.

To overcome the limitations of the existing product inspection system, recent studies applying a deep learning-based technology are being actively conducted, as shown in "CNN-based reference comparison method for classifying bare PCB defects," Wei, P., Liu, C., Liu, M., Gao, Y., and Liu, H., The Journal of Engineering, pp. 1528-1533, 2018. Deep learning-based technology is advantageous in that it can find optimal patterns for product defect discrimination based on analysis and learning of a large amount of data and can appropriately express a plurality of features for discrimination. Therefore, the deep learning-based technology has high accuracy compared to the existing rule-based algorithm and features a very robust operation against disturbances such as minute positional differences and lighting differences.

However, the application of deep learning-based technology still involves issues to be solved in terms of hardware or the issue of replacing the existing system in its entirety. Additionally, there are cases in which the system configuration is provided without considering the user interface/user experience (UI/UX) for smooth system operation of field system administrators who lack understanding of deep learning-based technologies.

Therefore, against these various deficiencies, linking the deep learning-based model developed for product inspection to interwork with the existing product inspection system needs to be systematized.

BRIEF SUMMARY OF THE INVENTION

The present disclosure in some embodiments seeks to provide a product inspection method and system for detecting product defects by linking a predeveloped deep learning-based classification model to interwork with the existing product inspection system while fine-tuning the classification model to be maintained or supplemented by instantly correcting errors, thereby improving the accuracy of product quality inspection.

According to at least one embodiment, the present disclosure provides a method performed by a computing apparatus for retraining a classification model for inspecting a defect of a product, the method including the steps (not necessarily in the following order) of (i) capturing image data of the product, (ii) determining, based on the image data, whether the product is OK or no good in quality by using the classification model that is based on deep learning and present on an edge computer, and selecting an error image, (iii) adjusting or fine-tuning the set of parameters of the classification model based on the error image, and (iv) extracting and transmitting the adjusted or fine-tuned set of parameters of the classification model to a server.

According to another embodiment of the present disclosure, the method of retraining a classification model further includes transmitting, by the edge computer in idle time, the error image to the server, and receiving, by the edge computer, the adjusted or fine-tuned set of parameters of the classification model that is retrained by the server.

According to at least one embodiment, the present disclosure provides an inspection system including an input unit, an edge computer, and a server. The input unit is configured to capture a product to generate image data. The edge computer includes a classification model that is based on deep learning and is configured to generate an inspection result, based on the image data, on whether the product is OK or no good in quality by using the classification model, to select an error image based on the inspection result outputted from the classification model, and to fine-tune the classification model based on the error image. The server is configured to retrain the classification model based on the error image and data for learning and to transmit the adjusted and retrained set of parameters classification model to the edge computer.

According to yet another embodiment, the present disclosure provides a non-transitory computer-readable medium storing instructions that, when executed by a processor, cause the processor to control a system to perform functions for retraining a classification model, the functions comprising: capturing image data of the product; determining, based on the image data, whether the product is OK or no good in quality by using the classification model that is based on deep learning and present on an edge computer, and selecting an error image; adjusting or fine-tuning the set of parameters of the classification model based on the error image; and extracting and transmitting the adjusted or fine-tuned set of parameters of the classification model to a server.

As described above, according to some embodiments, the present disclosure provides a product inspection method and system for detecting product defects by linking a predeveloped deep learning-based classification model to interwork with the existing product inspection system while fine-tuning the classification model to be maintained or supplemented by instantly correcting errors of the classification model, thereby improving the accuracy of product quality inspection.

DETAILED DESCRIPTION OF THE INVENTION

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, various terms such as first, second, A, B, (a), (b), etc., are used solely for the purpose of differentiating one component from the other but not to imply or suggest the substances, the order, or sequence of the components. Throughout this specification, when a part "includes" or "comprises" a component, the part is meant to further include other components, not excluding thereof unless there is a particular description contrary thereto. The terms such as "unit," "module," and the like refer to a unit for processing at least one function or operation, which may be implemented by hardware, software, or a combination thereof.

The detailed description to be disclosed hereinafter together with the accompanying drawings is intended to describe illustrative embodiments of the present disclosure and is not intended to represent the only embodiments in which the present disclosure may be practiced.

The present embodiment discloses a product inspection method and a system based on deep learning for detecting a product defect. Specifically, the present disclosure provides a product inspection method and system for detecting product defects by linking a predeveloped deep learning-based classification model to interwork with the existing product inspection system while fine-tuning the classification model to be maintained or supplemented by instantly correcting errors, thereby improving the accuracy of product quality inspection.

Hereinafter, the description of the present disclosure assumes that the product includes surface-mounted components on a printed circuit board (PCB) and defects occur in a variety of ways depending on the type of product, surface mount technology (SMT), etc.

Defects of the product may include a false defect and a true defect. Here, a false defect is for a product that has an acceptable quality or OK quality but is determined wrongfully as not having the acceptable quality or no good (NG) quality, and a true defect is for a no-good product determined as no good.

A typical product inspection system operates in conjunction with various process systems. Although various process systems may be related according to the scale or system of a factory, core systems related to the contents of the present disclosure are a Manufacturing Execution System (MES) and a Programmable Logic Controller (PLC).

MES is an information system that can help decision-making by storing and providing in real-time a large amount of data generated in a series of production activities that a planned product goes through toward a finished product. Since MES also stores the inspection result on product quality performed in each process, the deep learning-based technology when applied to the product production process may require interworking between the deep learning-based system and MES may be required.

PLC is a device and system for controlling the input and output of the process equipment to operate according to a specific sequence. The progress of the product to the next process is closely related to the product inspection result and can be controlled by PLC. For example, PLC stacks products determined to be defective in a buffer for disposal or repair and proceeds with the next process (assembly and packaging, etc.) for products determined as OK quality.

Figure 1:
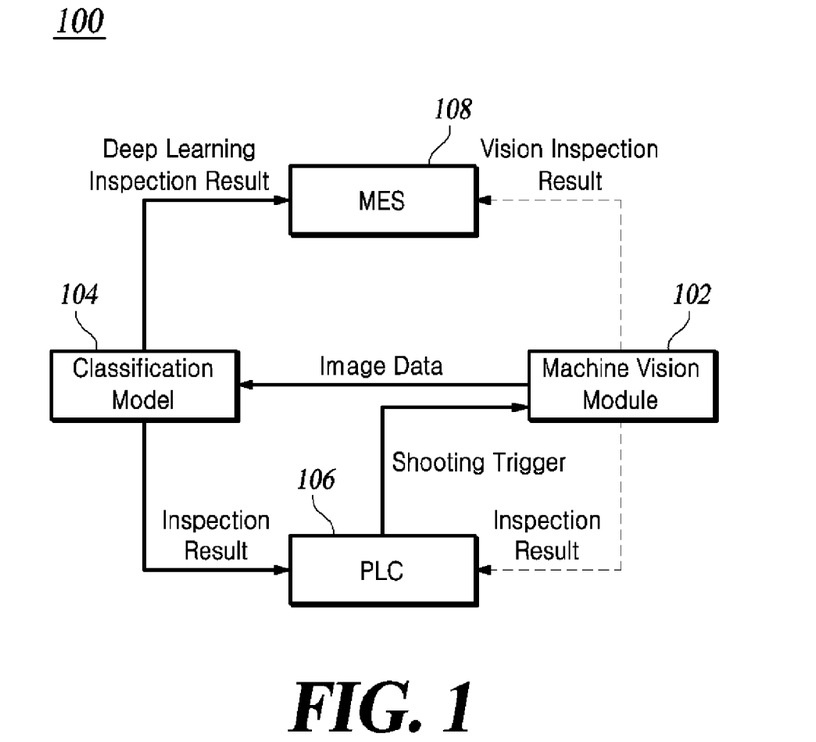
FIG. 1 is a schematic block diagram of a product inspection system based on deep learning for detecting product defects according to at least one embodiment of the present disclosure.

FIG. 1 is a schematic block diagram of a product inspection system 100 for detecting product defects according to at least one embodiment of the present disclosure.

The product inspection system 100 for detecting product defects (hereinafter 'detection system' 100) according to the present disclosure inspects the product by using a previously developed deep learning-based classification model and fine-tunes the classification model to immediately correct its errors and thereby maintain or supplement the classification model. The detection system 100 includes all or some of a machine vision module 102, a classification model 104, a PLC (programmable logic controller) 106, and an MES (manufacturing execution system) 108. Here, components included in the detection system 100 according to the present disclosure are not necessarily limited to these particulars. For example, the detection system 100 may further include a training unit (not shown) for training the classification model or may be implemented in a form that interworks with an external training unit.

The machine vision module 102 generates image data by photographing or imaging a product to be inspected after having passed one process. To this end, the machine vision module 102 includes a camera for capturing an image. The machine vision module 102 serves as an input unit for obtaining image data.

The classification model 104 determines whether the target product is good (OK) or bad (NG: No Good) by performing a deep learning-based inspection based on the image data. The classification model 104 provides the inspection result of OK/NG quality to the PLC 106 and provides a deep learning-based inspection result to the MES 108. The deep learning-based inspection result may include, further to the OK/NG quality inspection result, the type of defect, e.g., over soldering, under soldering, non-soldering, etc., errors due to malfunction of the classification model 104, and the like. Here, the causes of the errors may be an algorithm problem of the classification model 104, non-delivery of image data from the machine vision module 102, a problem of a device (not shown) in which the classification model 104 is installed, and the like. The deep learning-based inspection result may also include these causes of the errors.

The inspection system 100 may process the product as defective when an error occurs due to a malfunction of the classification model.

PLC 106 transmits an imaging request or shooting trigger for using a camera to the machine vision module 102. Additionally, the PLC 106 may determine whether to proceed to the next process by obtaining the inspection result on the OK/NG quality of the product from the classification model 104.

MES 108 obtains and stores the deep learning-based inspection result from the classification model 104. The stored result may be later used in a training process for the classification model 104.

Meanwhile, when the classification model 104 is partially used in the inspection system 100, the machine vision module 102 may perform a vision inspection based on the captured image to determine the OK/No-Good quality of the target product. Here, as the vision inspection, a conventional binarization inspection may be used. The machine vision module 102 provides the OK/NG quality inspection result to the PLC 106 and provides the vision inspection result to the MES 108 as indicated by dotted lines in the illustration of FIG. 1. The vision inspection result may include, further to the OK/NG quality inspection result, the type of defect, errors due to a malfunction of the machine vision module 102, and the like. When performing this vision inspection, the deep learning-based inspection performed by the classification model 104 turns into a re-inspection of the first-round inspection result of the machine vision module 102, the process of which will be described below.

FIG. 1 is an exemplary configuration according to this embodiment, although the present disclosure envisions various other implementations incorporating other components or other interconnections of components according to the structure and operation of the classification model, the structure and operation of the machine vision module, the structure and operation of PLC and MES, and the like.

Meanwhile, the classification model 104 according to the present embodiment uses a deep neural network based on deep learning but may be trained in advance by using data for learning or training data.

The training data may be collected by obtaining an image of a product or a part included in a product in a restrictive situation of operating a production line based on the production process of the product. Additionally, the training data may be collected according to various conditions, such as production volume, production period, and whether to store data. To each image included in the collected training data, a label is assigned for indicating OK/NG quality.

The training data may undergo a pre-processing step to be suitable for the classification model 104 to process. The pre-processing step may include selecting a region of interest (ROI), image cropping therefor, and data augmentation. Here, the data augmentation technique may include performing image transformation for giving a geometric change or color change to the original image, generating a virtual image based on distribution and characteristics of the original image, and the like.

As a deep neural network for use as the classification model 104, a Convolutional Neural Network-based or CNN-based deep neural network may be selected, which exhibits excellent performance in the image processing field. The CNN-based deep neural networks may be divided into classification-based models and detection-based models. A classification-based model may be used when product defects appear globally throughout the ROI of the image. ResNet is a representative CNN-classification-based model. On the other hand, when product defects are locally distributed in an image and their types are similar, a detection-based model may be used. A You Only Look Once (YOLO) model is a representative CNN-detection-based model.

Meanwhile, the output of the classification model 104 may be implemented as a softmax function and provide a probability value for each of OK and NG qualities.

The training unit according to this embodiment performs pre-training on the classification model 104 based on training data. The training unit defines a loss function based on dissimilarity between the inspection result inferred by using the classification model 104 and the target label. The training unit further proceeds with training on the classification model 104 by updating the parameter of the classification model 104 toward reducing the loss function. Here, the dissimilarity used may include distance, e.g., L1 metric, L2 metric, etc., and similarity, e.g., cosine similarity, inner product, cross entropy, etc. among others as long as they can express a difference between two comparison targets.

Meanwhile, when the deep learning-based classification model 104 that is previously developed is applied to the product inspection system 100 to improve the accuracy of defect detection, a category of the improvement may be determined based on the characteristics of the production process and product inspection system. The classification model 104 may be linked to an existing system or may completely replace a detection technology (e.g., vision inspection) of an existing system.

Additionally, depending on whether the defective rate for enhancing accuracy is a false/true defective rate, how the classification model 104 is linked to interwork with the existing system may vary. For example, when many false defects occur in the existing system, the classification model 104 may be trained by focusing on reducing false defects. This is effective in terms of improving the work efficiency of operators or improving product yield. On the other hand, when the existing system suffers from a low detection accuracy for true defects, preferentially improving the detection accuracy by using the deep learning-based classification model can lead to improvements of the non-adjusted ratio and quality. In both cases, upon completing the improvement, the present disclosure allows the existing inspection technology to be completely replaced by the deep learning-based classification model.

Figure 2:
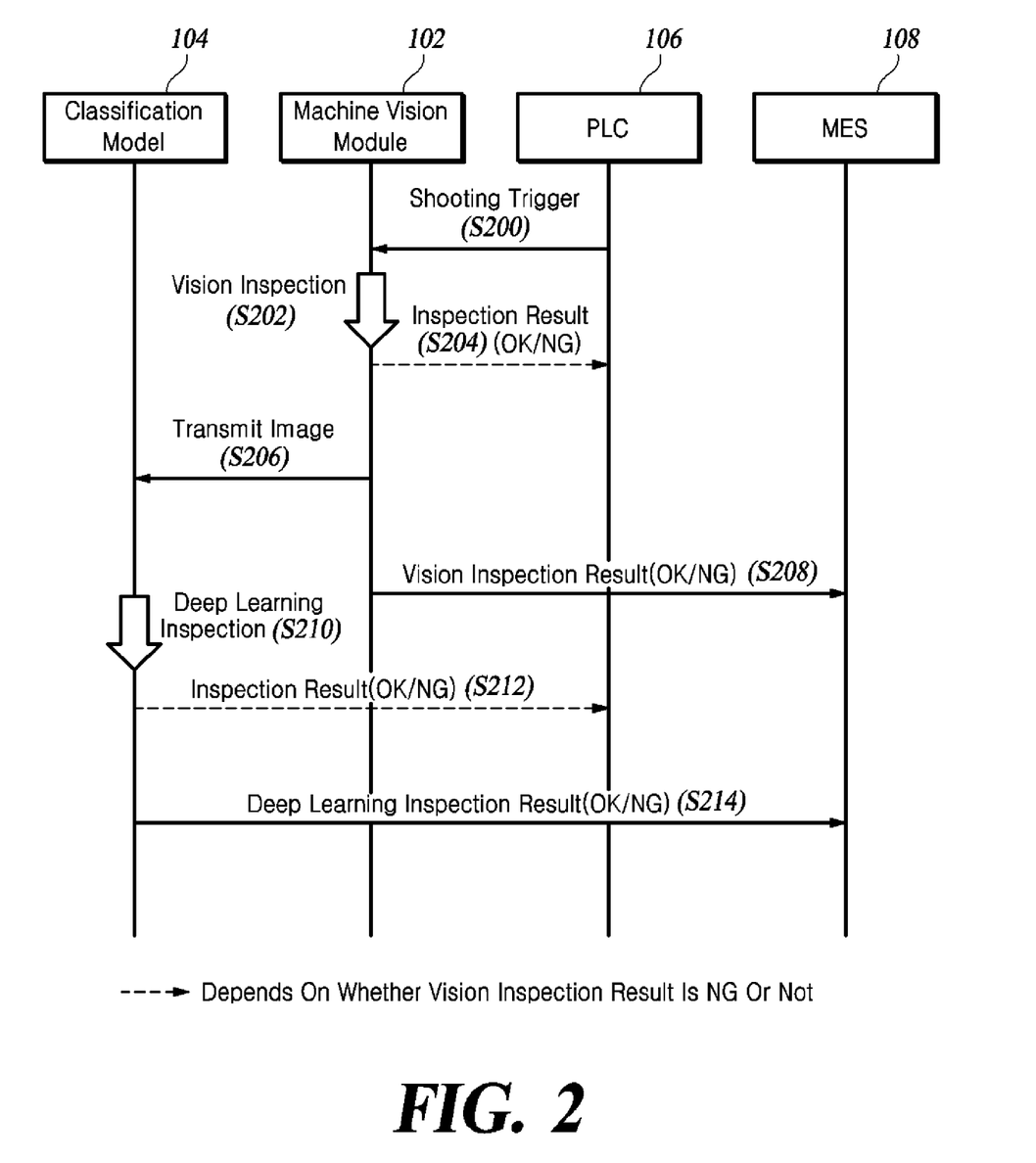
FIG. 2 is a flowchart of a method of partially applying a classification model to an inspection system according to at least one embodiment of the present disclosure.
Figure 3:
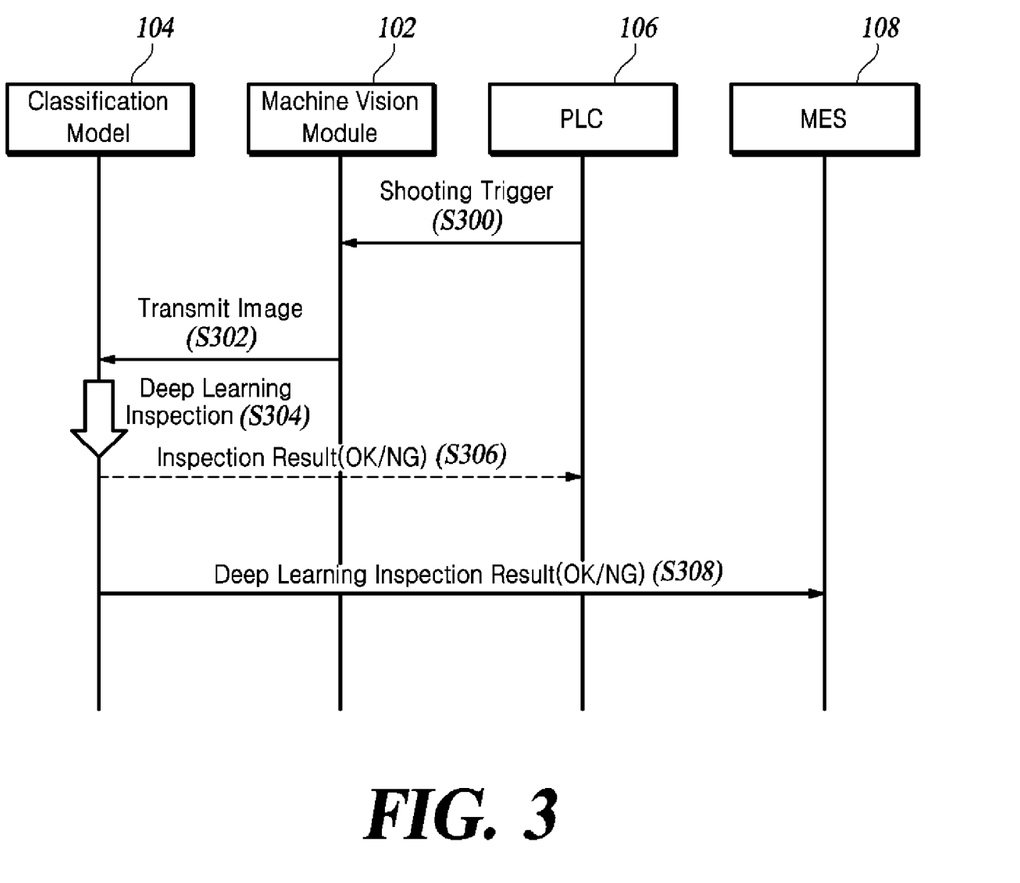
FIG. 3 is a flowchart of a method of applying a classification model to an inspection system according to at least one embodiment of the present disclosure.

The following describes, referring to FIGS. 2 and 3, illustrative embodiments that link the previously developed classification model 104 to interwork with an existing product inspection system or render the previously developed classification model 104 to replace the existing inspection system technology.

FIG. 2 is a flowchart of a method of partially applying a classification model to an inspection system according to at least one embodiment of the present disclosure.

PLC 106 transmits a shooting trigger to the machine vision module 102 (S200).

The machine vision module 102 captures an image of the product to be inspected and determines whether the target product is of OK/NG quality by performing a vision inspection based on the captured image (S202).

Machine vision module 102 provides the inspection result on the OK/NG quality to the PLC 106 (S204), the captured image to the classification model 104 (S206), and vision inspection result to the MES 108 (S208).

The classification model 104 performs a deep learning inspection based on an image corresponding to the OK/NG quality inspection result (S210). Where the goal is to reduce the false defect rate, the classification model 104 operates to re-inspect the image that the machine vision module 102 has determined as an NG product. On the other hand, when it is desired to improve the detection rate of undetected true defects, the classification model 104 operates to re-inspect the image that the machine vision module 102 has determined as an OK product.

The classification model 104 provides the inspection result to the PLC 106 (S212) and provides the deep learning inspection result to the MES 108 (S214).

FIG. 3 a flowchart of a method of applying a classification model to an inspection system according to at least one embodiment of the present disclosure.

PLC 106 transmits an imaging request or shooting trigger to the machine vision module 102 (S300).

The machine vision module 102 takes an image of the product to be inspected and provides the captured image to the classification model 104 (S302).

The classification model 104 performs a deep learning inspection based on the image (S304), provides the inspection result to the PLC 106 (S306) and provides the deep learning inspection result to the MES 108 (S308).

The device that is installed with the classification model 104 according to the present embodiment may be a programmable computer and is hereinafter referred to as an edge computer. In addition to the classification model 104, the edge computer may include a training unit for performing fine-tuning. The edge computer stores images for a certain period and includes at least one communication interface that is linkable to a server (not shown).

The server is connected to a plurality of edge computers, including a training unit to perform training on the classification model 104 and data storage. The server may be installed separately from the MES 108 for different purposes. The MES 108 stores data related to product production, inspection result, etc. in the form of a table, while the server stores data related to training on the classification model 104 and uses the data for learning the classification model. The server may interwork with the MES 108 by selecting a necessary part of the data stored in the MES 108 and using it for training the classification model 104.

Where multiple production processes exist and product inspection is performed for each of the processes, the edge computer included in the process is installed with one classification model, whereas the server may store training-related data for all the classification models that are used by the multiple connected edge computers and use those training-related data for training the respective classification models.

As described above, training on the classification model 104 may be performed in the server. The training unit of the server may perform training on the deep neural network model having the same structure as the classification model 104 installed in the edge computer. Using a communication interface connected to the edge computer, the server may transmit a set of parameters of the trained deep neural network model to the edge computer, when the edge computer may use the received set of parameters to set the parameters of the classification model 104. Additionally, the set of parameters of the classification model 104 may be set at the time of shipment of the edge computer or the time when the classification model 104 is installed in the edge computer.

The user of the system may lack understanding of deep learning techniques and processes when the previously developed deep learning-based classification model 104 is applied and used in the inspection system 100 as in the above-described process. In general, since deep learning-based algorithms are not easy to modify intuitively, it is difficult for system users to easily maintain or supplement the algorithm. For example, with an existing system, maintenance can be done by adjusting a small number of system parameter values, whereas a deep learning-based model requires retraining and checking whether training has been performed properly among others, making the maintenance process challenging and complicated.

Figure 4:
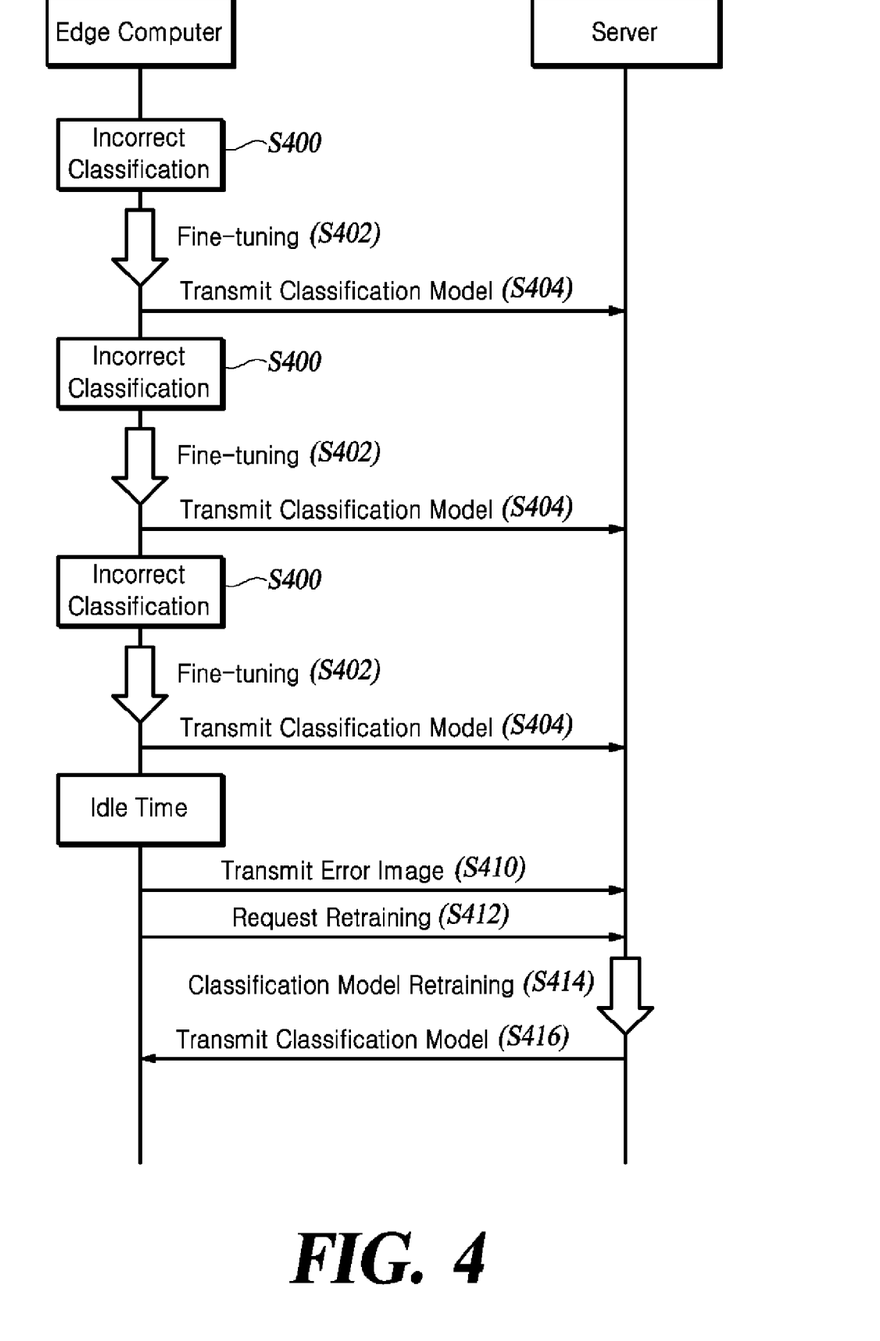
FIG. 4 is a flowchart of a method of fine-tuning a classification model according to at least one embodiment of the present disclosure.

The following describes, referring to FIG. 4, a fine-tuning method for maintaining the classification model 104 that is being used as a part of the inspection system 100. This fine-tuning process may be applied to both the embodiments of FIGS. 2 and 3.

FIG. 4 is a flowchart of a method of fine-tuning a classification model according to at least one embodiment of the present disclosure.

The edge computer performs an inspection on the target product by using the classification model 104 and sorts out an error image (S400). Here, the error image indicates an image that disables a proper determination of OK/NG quality. When based on the softmax function value that is the output of the classification model 104, but, for example, when the probability values of OK and NG qualities are similar within a preset range, the present disclosure can select a candidate group of the error images and allow the operator to assign a label to the selected candidate group in its entirety or in part. The following description of the present embodiment assumes that the error image includes a label.

The training unit included in the edge computer adjusts or fine-tunes the set of parameters of the classification model 104 by using the error image (S402).

A typical deep learning-based classification model responds to the occurrence of an error image as described above by retraining the classification model with both the error image and the existing training data. This is because retraining performed with only partial data will result in a deteriorated detection performance on the existing training data. However, when performing such retraining, it takes a long time to be able to use the re-trained classification model, which may cause a great setback in the productivity of the product.

The present disclosure performs adjusting or fine-tuning of the set of parameters of the classification model 104 immediately every time an error image occurs, to prevent a reduction in yield or non-adjusted ratio due to accumulation of errors at the production site. Since the fine-tuning is applied limitedly to the error image, it can be performed within a faster time (depending on the edge computer performance, but usually about a few seconds) compared to the conventional retraining process. Additionally, limiting the number of fine adjustments to a preset range (e.g., 5 times) can prevent deterioration of detection performance on existing training data.

Meanwhile, fine-tuning of the classification model 104 may be performed in the same manner based on the same loss function as used in the pre-training process for the classification model 104 as described above.

The edge computer transmits the adjusted set of parameters of the classification model 104 to the server to enable roll-back to the classification model 104, and the server stores the set of parameters (S404).

While the edge computer performs a defect inspection on the product, these fine-tuning steps S400 to S404 may be reiterated.

The edge computer transmits, to the server, the error image stored in the idle time, uninterrupted by product inspection (S410), and requests retraining on the classification model 104 (S412).

The server retrains the pre-stored classification model 104 based on the transmitted error images and existing training data (S414), and then transmits the set of parameters of the retrained classification model 104 to the edge computer (S416). After performing the retraining, the server may include the error images used for the retraining in the training data for the relevant classification model. Meanwhile, the retraining of the classification model 104 may be performed in the same manner based on the same loss function as used in the pre-training process for the classification model 104 as described above.

As described above, according to some embodiments, the present disclosure provides a product inspection method and system for detecting product defects by linking a predeveloped deep learning-based classification model to interwork with the existing product inspection system while fine-tuning the classification model to be maintained or supplemented by instantly correcting errors of the classification model, thereby improving the accuracy of product quality inspection.

Although some embodiments of the present disclosure present flowcharts with the steps thereof illustrated as being sequentially performed, they merely instantiate the technical idea of some embodiments of the present disclosure. Therefore, a person having ordinary skill in the pertinent art could incorporate various modifications, additions, and substitutions in practicing the present disclosure by changing the sequence of steps described by the respective flowcharts or by performing one or more of the steps in the flowcharts in parallel, and hence the steps in the respective flowcharts are not limited to the illustrated chronological sequences.

Various implementations of the systems and methods described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. Computer programs (which are also known as programs, software, software applications, or code) contain instructions for a programmable processor and are stored in a "computer-readable recording medium."

The computer-readable recording medium includes any type of recording device on which data that can be read by a computer system are recordable. Examples of the computer-readable recording medium include non-volatile or non-transitory media such as a ROM, CD-ROM, magnetic tape, floppy disk, memory card, hard disk, optical/magnetic disk, storage devices, and the like. Further, the computer-readable recording medium can be distributed in computer systems connected via a network, wherein the computer-readable codes can be stored and executed in a distributed mode.

Various implementations of the systems and techniques described herein can be realized by a programmable computer. Here, the computer includes a programmable processor, a data storage system (including volatile memory, nonvolatile memory, or any other type of storage system or a combination thereof), and at least one communication interface. For example, the programmable computer may be one of a server, a network device, a set-top box, an embedded device, a computer expansion module, a personal computer, a laptop, a personal data assistant (PDA), a cloud computing system, and a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A non-transitory computer-readable medium comprising instructions that, when executed by a processor, cause the processor to control a manufacturing execution system that includes a machine vision module and a classification deep learning (DL) model, the system being controlled to perform functions of determining a quality of individual products and retraining the classification deep learning (DL) model trained to inspect products for defects, the functions including:

in response to a shooting trigger, capturing, with the machine vision module, a first image of a first product;

conducting a vision inspection with the machine vision module using the first image and outputting a vision inspection result to the manufacturing execution system;

providing the first image to an edge computer operating the classification DL model pre-trained by a server to determine, based on a set of parameters, whether a product has an acceptable quality based on an image capturing the product and output a DL inspection result to the manufacturing execution system, wherein the classification DL model is configured to perform:

in response to the first image provided thereto, attempting to determine, based on the first image, whether the first product has the acceptable quality;

determining that whether the first product has the acceptable quality cannot be determined using the first image; and in response to determining that whether the first product has the acceptable quality cannot be determined using the first image, determining that the first image contains an error image;

in response to determining that the first image contains an error image, adjusting, based on the error image, the set of parameters of the classification DL model on the edge computer;

extracting, from the edge computer, the adjusted set of parameters of the classification DL model; and transmitting the adjusted set of parameters of the classification DL model to the server via a communication network;

wherein adjusting the set of parameters of the classification DL model on the edge computer is limited to a preset range, and wherein, to reduce a false defect rate, the manufacturing execution system operates the classification DL model to re-inspect the first image when the machine vision module has determined the first product to be "not good," and, to improve a detection rate of undetected true defects, the manufacturing execution system operates the classification DL model to re-inspect the first image when the machine vision module has determined the first product to be an "OK" product.

\* \* \* \* \*